US011663615B1

(12) United States Patent
Ilin et al.

(10) Patent No.: US 11,663,615 B1
(45) Date of Patent: May 30, 2023

(54) PAGEVIEW PAYLOAD STORAGE AND REPLAY SYSTEM

(71) Applicant: Content Square SAS, Paris (FR)

(72) Inventors: Alexandre Ilin, Paris (FR); Theo Ropiteaux, Paris (FR); Ryad Zenine, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 17/877,805

(22) Filed: Jul. 29, 2022

(51) Int. Cl.
  *G06Q 30/0201* (2023.01)
  *H04L 67/50* (2022.01)

(52) U.S. Cl.
  CPC ....... *G06Q 30/0201* (2013.01); *H04L 67/535* (2022.05)

(58) Field of Classification Search
  CPC . G06T 2211/00; G06Q 30/0201; G06F 13/14; H04L 67/535
  See application file for complete search history.

(56) References Cited

U.S. PATENT DOCUMENTS

| | | | | |
|---|---|---|---|---|
| 8,185,608 | B1* | 5/2012 | York | G06Q 30/02 |
| | | | | 709/224 |
| 9,317,857 | B1* | 4/2016 | Terleski | G06Q 30/02 |
| 10,037,332 | B1* | 7/2018 | Clark | H04L 51/08 |
| 11,172,055 | B2* | 11/2021 | Donnelly | H04L 47/365 |
| 2005/0055425 | A1* | 3/2005 | Lango | G06F 16/10 |
| | | | | 348/E7.071 |
| 2010/0180043 | A1* | 7/2010 | Lau | H04N 21/6125 |
| | | | | 709/236 |
| 2010/0199340 | A1* | 8/2010 | Jonas | H04L 51/04 |
| | | | | 726/8 |
| 2011/0119267 | A1* | 5/2011 | Forman | G06Q 10/00 |
| | | | | 707/750 |
| 2013/0191492 | A1* | 7/2013 | Gittelman | G06F 11/0709 |
| | | | | 709/217 |
| 2014/0236772 | A1* | 8/2014 | McCoy | G06Q 20/06 |
| | | | | 705/26.81 |
| 2018/0357652 | A1* | 12/2018 | Meredith | G06Q 30/0635 |
| 2019/0295097 | A1* | 9/2019 | Fonoimoana | H04L 67/306 |
| 2021/0133257 | A1* | 5/2021 | Feijoo | G06F 16/954 |
| 2021/0365415 | A1* | 11/2021 | Liu | G06F 16/14 |
| 2022/0053061 | A1* | 2/2022 | Abdala | H04L 41/16 |

* cited by examiner

*Primary Examiner* — Etienne P Leroux
(74) *Attorney, Agent, or Firm* — Schwegman Lundberg & Woessner, P.A.

(57) ABSTRACT

A computing system receives a plurality of payloads from a plurality of computing devices, each of the plurality of payloads comprising one or more events for a pageview corresponding to a respective website. For every predefined time period, the computing system collects a plurality of payloads received within the predefined time period, stores the collected plurality of payloads in a single file in a datastore, generates metadata associated with the single file, and stores the generated metadata in a database comprising metadata for a plurality of single files. When the computing system receives a request for a pageview of a website, the computing system accesses the database to determine a plurality of payloads within one or more single files comprising payloads for the pageview of the website. The computing system generates the pageview by assembling the plurality of payloads for the pageview of the website.

20 Claims, 6 Drawing Sheets

PAGEVIEW PAYLOAD STORAGE AND REPLAY SYSTEM

BACKGROUND

The Internet is a collection of disparate computer systems which use a common protocol to communicate with each other. A common use of the Internet is to access websites. Websites are typically stored on a server and remotely accessed by a computing device over the Internet using a web browser.

To increase user visitations and revenue, websites have become very sophisticated. Websites typically include webpages that provide information to users, advertise products or services to users and/or provide site search functions for users. A problem for website owners is how to determine how successful the website is, for example, whether the informational or other needs of users are met and whether the users are purchasing goods and services advertised on their site. Techniques have been developed for recording user activity (events such as URLs accessed and the like) on websites to generate event streams and analytics to determine the success of a website, among other things. Storage and retrieval for such a vast amount of data, however, consumes significant computing resources.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
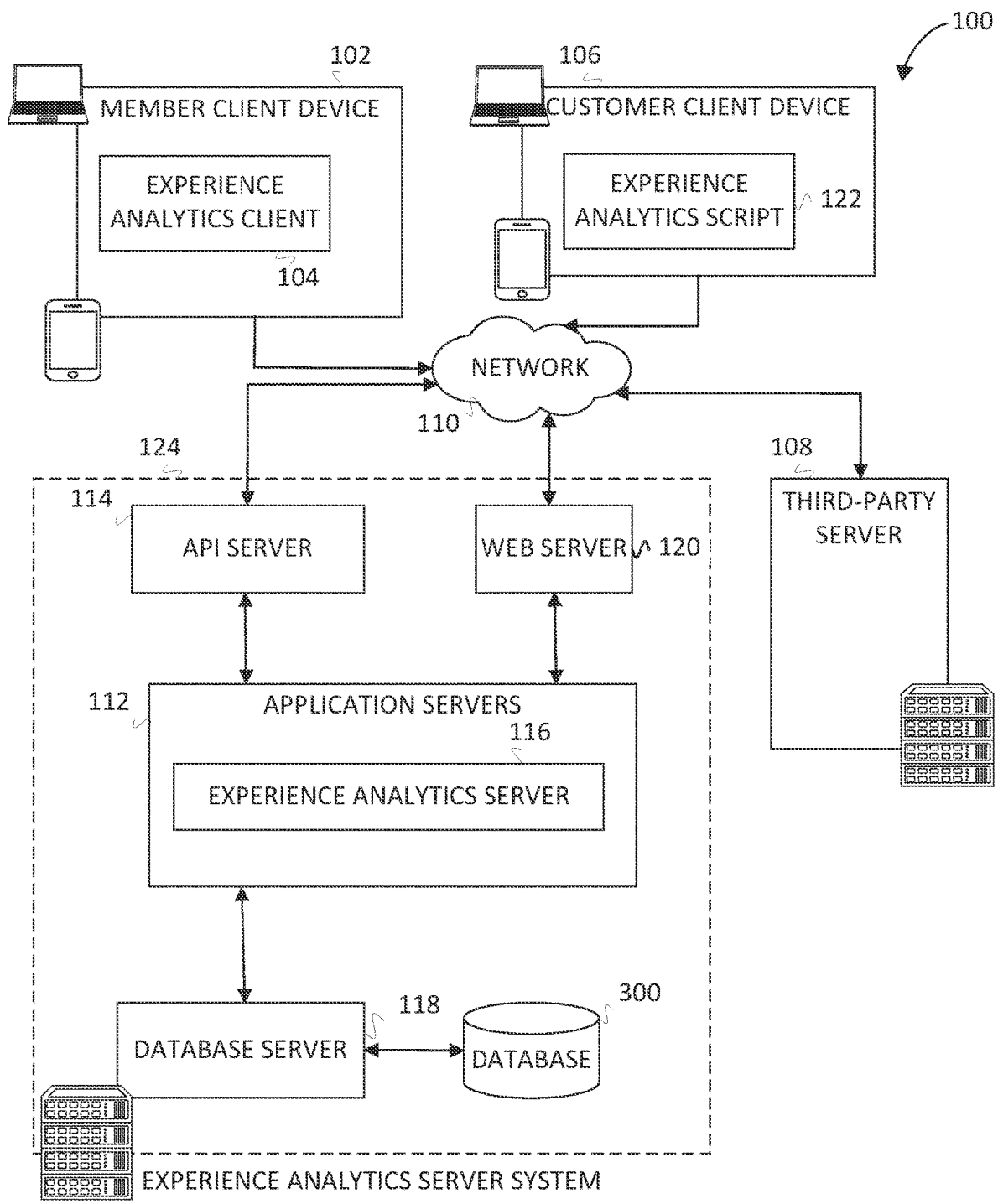
FIG. 1 is a diagrammatic representation of a networked environment in which the present disclosure may be deployed, in accordance with some examples.

As explained above, techniques have been developed for recording user activity (events such as URLs accessed and the like) on websites to generate event streams and analytics to determine the success of a website, among other things. For example, certain techniques allow for recording of user activity on websites to generate event steams that enable playback of user activity corresponding to different user session on a given computing device. By providing such playback of user sessions, different insights can be determined to facilitate improved debugging of problematic areas of such websites, identifying areas or URLs that could be targeted for improvements, among other types of insights. The recordings of user activity, however, comprise many small individual files that add up to a large amount of data and a large amount of processing power to store and access such data. Thus, storage and retrieval for such a vast amount of data consumes significant computing resources.

To use a specific example, a user may visit a website and proceed to click on some text, scroll down a webpage, and so forth which are referred to herein as events. The user may then pause for a while and then continue with some further events on the webpage and then move on to other webpages on the website. These recorded events are received regularly in payloads. Each payload comprises one or more events that happened in a given timeframe. These events then need to be collected into one group that is constructed to make a pageview. A pageview comprises the events of a single webpage by a single user. Thus, all the events that the user performed on a single webpage are consolidated into a pageview and a pageview is constructed for each webpage of each website that was viewed. Each pageview for each user for each website is then stored for later viewing and analytics. For example, there may be thousands of users viewing webpages for each website, and this process may be occurring for many websites where each website is associated with a different entity. Thus, a lot of computer processing resources are used to construct each pageview and then a large number of very small files need to be stored. This results in many PUT operations to store each file and also a very large amount of storage taking much computing processing power and resources. Moreover, most pageviews created are never viewed. There is typically a request to view only about one pageview per 1000 pageviews, which results in unnecessary processing and construction of all of these pageviews, further wasting computing resources. For example, a user may wish to view a particular pageview out of many listed pageviews to view a recording of the events of the particular pageview for analysis and never request to view the other pageviews.

Embodiments described herein address these and other technical issues by providing a system that consolidates many payloads from multiple webpages and websites into a single file. For example, the system stores all payloads received in a predetermined time period, such as every 30 seconds, into a single file. Instead of reconstructing a pageview, the raw data of the payloads are stored directly into the single file and the single file is stored in one or more datastores, such as a cloud-based datastore. Since there is no single file for each pageview, the system generates an indexing system to index the payloads that are stored in each file. The system uses the indexing system to reconstruct a pageview upon receiving a request to view the pageview (e.g., real time or near real time). Further, each of these files can be compressed, resulting in even less storage needed since compression is much more effective on large files than on small files, and thus, even less storage is needed for the same data. This also results in a lower cost when storing files on a cloud datastore that is provided by a third-party cloud data storage provider. Moreover, these files can be stored in real time, or near real time, as the payloads are being received, making the data more resilient to outages and available in real time or near real time.

Further, after a predefined time period, such as several hours; the system regroups the files by projects for even faster retrieval and to reduce latency upon a request to view a pageview. In some examples a project is specific to a particular website and can be specific to one or more webpages within a website. For example, an entity may wish to figure out the issues on a checkout webpage on their ecommerce website and thus, sets up a project to capture events for the checkout webpage across numerous users.

In this way a pageview can be constructed from raw data in payloads contained in one or more single files or can be constructed from raw data in payloads contained in one or more files grouped by project, depending on when the request is received. Specifically, a computing system receives a plurality of payloads from a plurality of computing devices, each of the plurality of payloads comprising one or more events for a pageview corresponding to a respective website. For every predefined time period, the computing system collects a plurality of payloads received within the predefined time period, stores the collected plurality of payloads in a single file in a datastore, generates metadata associated with the single file, and stores the generated metadata in a database comprising metadata for a plurality of single files, each single file corresponding to a respective predefined time period. When the computing system receives a request for a pageview of a website, the computing system accesses the database to determine a plurality of payloads within one or more single files comprising payloads for the pageview of the website. The computing system generates the pageview by assembling the plurality of payloads for the pageview of the website and causes a replay session to be displayed on a computing device, using the generated pageview.

Networked Computing Environment

FIG. 1 is a block diagram showing an example experience analytics system 100 that analyzes and quantifies the user experience of users navigating a website, mobile websites, and applications. The experience analytics system 100 can include multiple instances of a member client device 102, multiple instances of a customer client device 106, and multiple instances of a third-party server 108.

The member client device 102 is associated with a client (also referred to herein as an "entity") of the experience analytics system 100, where the client has a website hosted on the client's third-party server 108. For example, the client can be a retail store that has an online retail website that is hosted on a third-party server 108. An agent of the client, such as a web master or an employee, can be the user of the member client device 10.

Each of the member client devices 102 hosts a number of applications, including an experience analytics client 104. Each experience analytics client 104 is communicatively coupled with an experience analytics server system 124 and third-party servers 108 via a network 110 (e.g., the Internet). An experience analytics client 104 can also communicate with locally-hosted applications using Applications Program Interfaces (APIs).

The member client devices 102 and the customer client devices 106 can also host a number of applications including Internet browsing applications, such as Chrome or Safari. The experience analytics client 104 can also be implemented as a platform that is accessed by the member client device 102 via an Internet browsing application or implemented as an extension on the Internet browsing application.

Users of the customer client device 106 can access client's websites that are hosted on the third-party servers 108 via the network 110 using the Internet browsing applications. For example, the users of the customer client device 106 can navigate to a client's online retail website to purchase goods or services from the website. While the user of the customer client device 106 is navigating the client's website on an Internet browsing application, the Internet browsing application on the customer client device 106 can also execute a client-side script (e.g., JavaScript (.*js)) such as an experience analytics script 122. In one example, the experience analytics script 122 is hosted on the third-party server 108 with the client's website and processed by the Internet browsing application on the customer client device 106. The experience analytics script 122 can incorporate a scripting language (e.g., a .*js file or a .json file).

In certain examples, a client's native application (e.g., ANDROID™ or IOS™ Application) is downloaded on the customer client device 106. In this example, the client's native application including the experience analytics script 122 is programmed in JavaScript leveraging a Software Development Kit (SDK) provided by the experience analytics server system 124. The SDK includes Application Programming Interfaces (APIs) with functions that can be called or invoked by the client's native application.

In one example, the experience analytics script 122 records data (also referred to here as "events") including the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, and so forth. The experience analytics script 122 transmits the data to experience analytics server system 124 via the network 110. In another example, the experience analytics script 122 transmits the data to the third-party server 108 and the data can be transmitted from the third-party server 108 to the experience analytics server system 124 via the network 110.

An experience analytics client 104 is able to communicate and exchange data with the experience analytics server system 124 via the network 110. The data exchanged between the experience analytics client 104 and the experience analytics server system 124 includes functions, such as commands to invoke functions, as well as payload data, such as website data, texts reporting errors, insights, merchandising information, adaptability information, images, graphs providing visualizations of experience analytics, session replay videos, and zoning and overlays to be applied on the website.

The experience analytics server system 124 supports various services and operations that are provided to the experience analytics client 104. Such operations include transmitting data to and receiving data from the experience analytics client 104. Data exchanges to and from the experience analytics server system 124 are invoked and controlled through functions available via user interfaces (UIs) of the experience analytics client 104.

The experience analytics server system 124 provides server-side functionality via the network 110 to a particular experience analytics client 104. While certain functions of the experience analytics system 100 are described herein as being performed by either an experience analytics client 104 or by the experience analytics server system 124, the location of certain functionality either within the experience analytics client 104 or the experience analytics server system 124 may be a design choice. For example, it may be technically preferable to initially deploy certain technology and functionality within the experience analytics server system 124 but to later migrate this technology and functionality to the experience analytics client 104 where a member client device 102 has sufficient processing capacity.

Turning now specifically to the experience analytics server system 124, an Application Program Interface (API) server 114 is coupled to, and provides a programmatic interface to, application servers 112. The application servers 112 are communicatively coupled to a database server 118, which facilitates access to a database 300 that stores data associated with experience analytics processed by the application servers 112. Similarly, a web server 120 is coupled to the application servers 112, and provides web-based interfaces to the application servers 112. To this end, the web server 120 processes incoming network requests over the Hypertext Transfer Protocol (HTTP) and several other related protocols.

The Application Program Interface (API) server 114 receives and transmits message data (e.g., commands and message payloads) between the member client device 102 and the application servers 112. Specifically, the Application Program Interface (API) server 114 provides a set of interfaces (e.g., routines and protocols) that can be called or queried by the experience analytics client 104 or the experience analytics script 122 in order to invoke functionality of the application servers 112. The Application Program Interface (API) server 114 exposes to the experience analytics client 104 various functions supported by the application servers 112, including generating information on errors, insights, merchandising information, adaptability information, images, graphs providing visualizations of experience analytics, session replay videos, zoning and overlays to be applied on the website, and so forth.

The application servers 112 host a number of server applications and subsystems, including for example an experience analytics server 116. The experience analytics server 116 implements a number of data processing technologies and functions, particularly related to the aggregation and other processing of data including the changes in the interface of the website being displayed on the customer client device 106, the elements on the website being displayed or visible on the interface of the customer client device 106, the text inputs by the user into the website, a movement of a mouse (or touchpad) cursor and mouse (or touchpad) clicks on the interface of the website, and so forth, received from multiple instances of the experience analytics script 122 on customer client devices 106. The experience analytics server 116 implements processing technologies and functions, related to generating user interfaces including information on errors, insights, merchandising information, adaptability information, images, graphs providing visualizations of experience analytics, session replay videos, zoning and overlays to be applied on the website, etc. Other processor and memory intensive processing of data may also be performed server-side by the experience analytics server 116, in view of the hardware requirements for such processing.

System Architecture

Figure 2:
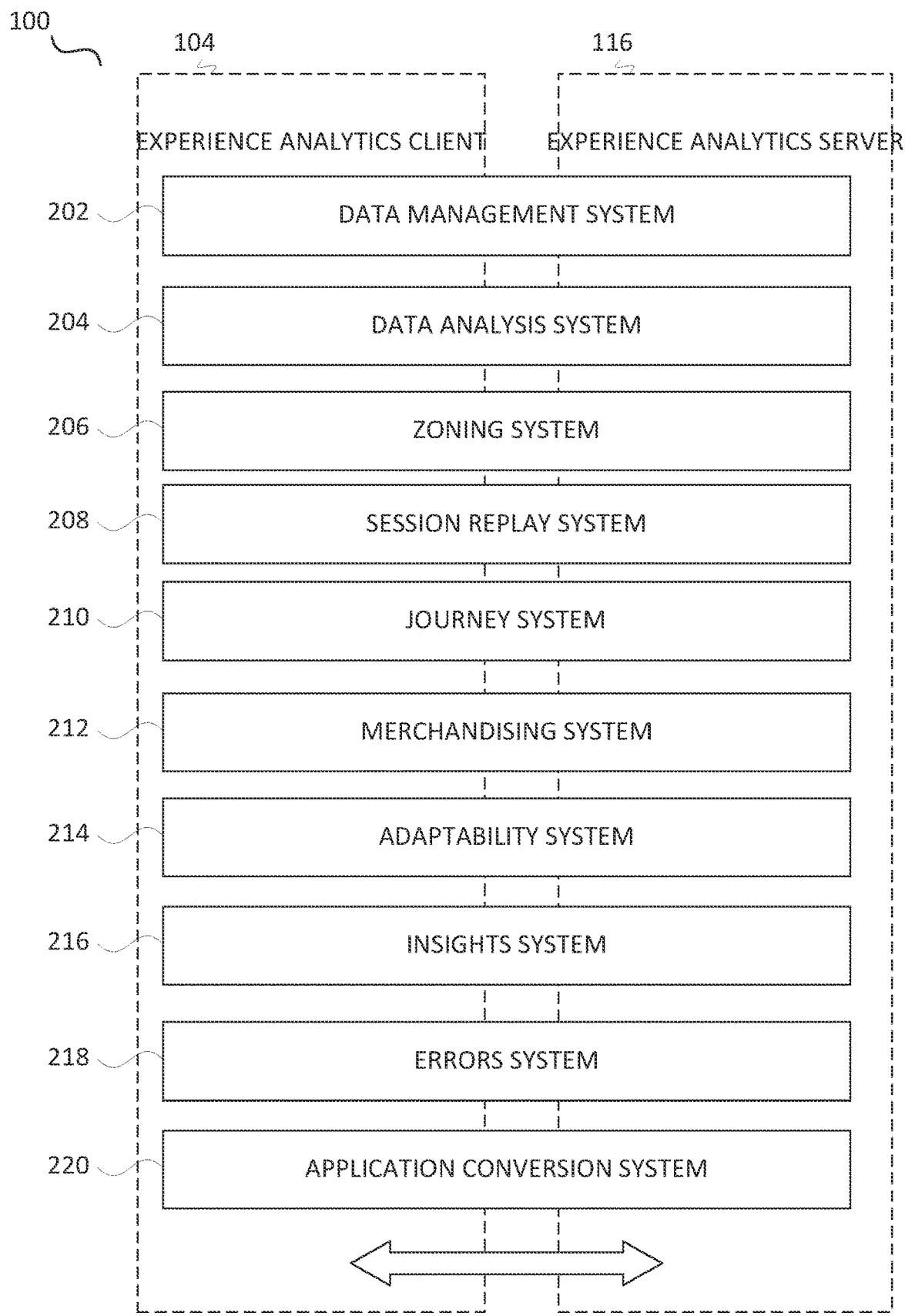
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 104 and the experience analytics server 116. The experience analytics system 100 embodies a number of subsystems, which are supported on the client-side by the experience analytics client 104 and on the server-side by the experience analytics server 116. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the member client devices 102, the experience analytics script 122 executed by each of the customer client devices 106, and the third-party servers 108. The data management system 202 is also responsible for exporting data to the member client devices 102 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the member client device 102 via the experience analytics client 104. The zoning interface provides a visualization of how the users via the customer client devices 106 interact with each element on the client's website. The zoning interface can also provide an aggregated view of in-page behaviors by the users via the customer client device 106 (e.g., clicks, scrolls, navigation). The zoning interface can also provide a side-by-side view of different versions of the client's website for the client's analysis. For example, the zoning system 206 can identify the zones in a client's website that are associated with a particular element displayed on the website (e.g., an icon, a text link). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 208 is responsible for generating the session replay interface to be displayed by the member client device 102 via the experience analytics client 104. The session replay interface includes a session replay that is a video reconstructing an individual user's session (e.g., visitor session) on the client's website. The user's session starts when the user arrives into the client's website and ends upon the user's exit from the client's website. A user's session when visiting the client's website on a customer client device 106 can be reconstructed from the data received from the user's experience analytics script 122 on customer client devices 106. The session replay interface can also include the session replays of a number of different visitor sessions to the client's website within a period of time (e.g., a week, a month, a quarter). The session replay interface allows the client via the member client device 102 to select and view each of the session replays. In one example, the session replay interface can also include an identification of events (e.g., failed conversions, angry customers, errors in the website, recommendations or insights) that are displayed and allow the user to navigate to the part in the session replay corresponding to the events such that the client can view and analyze the event.

The journey system 210 is responsible for generating the journey interface to be displayed by the member client device 102 via the experience analytics client 104. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 106) to the website, and illustrates the visited pages and the order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the member client device 102 via the experience analytics client 104. The merchandising interface includes merchandising analysis that provides the client with analytics on merchandise to be promoted on the website, optimization of sales performance, items in the client's product catalog on a granular level, competitor pricing, and the like. The merchandising interface can, for example, comprise graphical data visualization pertaining to product opportunities, category, brand performance, and so forth. For instance, the merchandising interface can include the analytics on conversions (e.g., sales, revenue) associated with a placement or zone in the client website.

The adaptability system 214 is responsible for creating accessible digital experiences for the client's website to be displayed by the customer client devices 106 for users that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can, with proper user permissions, analyze the data from the experience analytics script 122 to determine whether an accessibility-enhanced version of the client's website is needed, and can generate the accessibility-enhanced version of the client's website to be displayed by the customer client device 106.

The insights system 216 is responsible for analyzing the data from the data management system 202 and the data analysis system 204 to surface insights that include opportunities as well as issues that are related to the client's website. The insights can also include alerts that notify the client of deviations from a client's normal business metrics. The insights can be displayed by the member client devices 102 via the experience analytics client 104 on a dashboard of a user interface, as a pop-up element, as a separate panel, and so forth. In this example, the insights system 216 is responsible for generating an insights interface to be displayed by the member client device 102 via the experience analytics client 104. In another example, the insights can be incorporated in another interface such as the zoning interface, the session replay, the journey interface, or the merchandising interface to be displayed by the member client device 102.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey in the website and the page that adversely affects (e.g., causes frustration for) the users on customer client devices 106 visiting the client's website. The errors can also include causes of looping behaviors by the users, in-page issues such as unresponsive calls to action and slow loading pages. The errors can be displayed by the member client devices 102 via the experience analytics client 104 on a dashboard of a user interface, as a pop-up element, as a separate panel, and the like. In this example, the errors system 218 is responsible for generating an errors interface to be displayed by the member client device 102 via the experience analytics client 104. In another example, the insights can be incorporated in another interface such as the zoning interface, the session replay, the journey interface, or the merchandising interface to be displayed by the member client device 102.

The application conversion system 220 is responsible for the conversion of the functionalities of the experience analytics server 116 as provided to a client's website to a client's native mobile applications. For instance, the application conversion system 220 generates the mobile application version of the zoning interface, the session replay, the journey interface, the merchandising interface, the insights interface, and the errors interface to be displayed by the member client device 102 via the experience analytics client 104. The application conversion system 220 generates an accessibility-enhanced version of the client's mobile application to be displayed by the customer client devices 106.

Data Architecture

Figure 3:
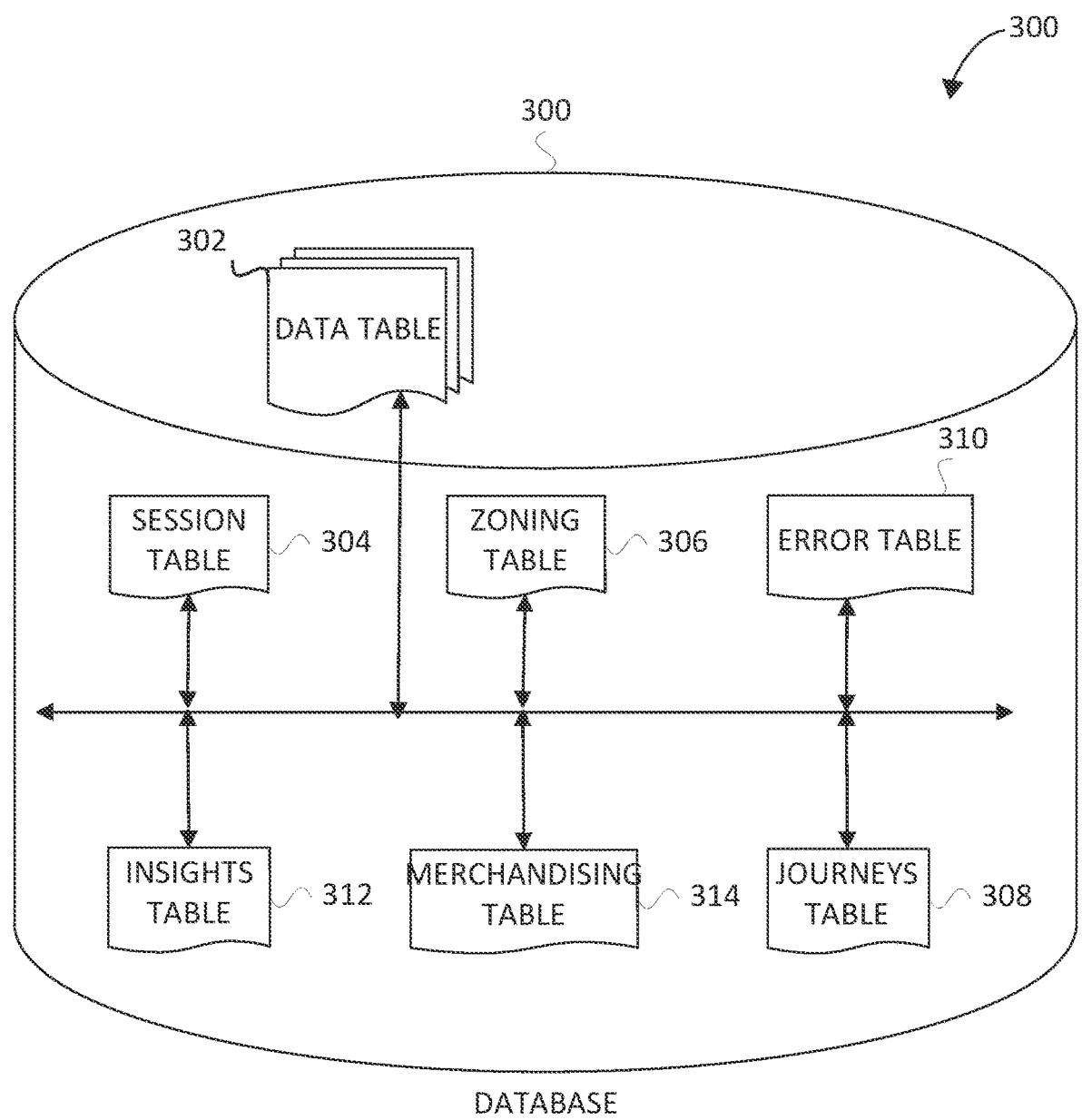
FIG. 3 is a diagrammatic representation of a data structure as maintained in a database, in accordance with some examples.

FIG. 3 is a schematic diagram illustrating database 300, which may be stored in the database 300 of the experience analytics server 116, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, and so forth. The data table 302 can also store data tags and results of data science and data engineering processes on the data. The data table 302 can also store information such as the font, the images, the videos, the native scripts in the website or applications, and so forth.

The session table 304 stores session replays for each of the client's websites and native applications.

The zoning table 306 stores data related to the zoning for each of the client's websites and native applications including the zones to be created and the zoning overlay associated with the websites and native applications.

The journeys table 308 stores data related to the journey of each visitor to the client's website or through the native application.

The error table 310 stores data related to the errors generated by the errors system 218 and the insights table 312 stores data related to the insights generated by the insights system 218.

The merchandising table 314 stores data associated with the merchandising system 212. For example, the data in the merchandising table 314 can include the product catalog for each of the clients, information on the competitors of each of the clients, the data associated with the products on the websites and applications, the analytics on the product opportunities the performance of the products based on the zones in the website or application, and so forth.

Process

Although the described flowcharts can show operations as a sequential process, many, of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Figure 4:
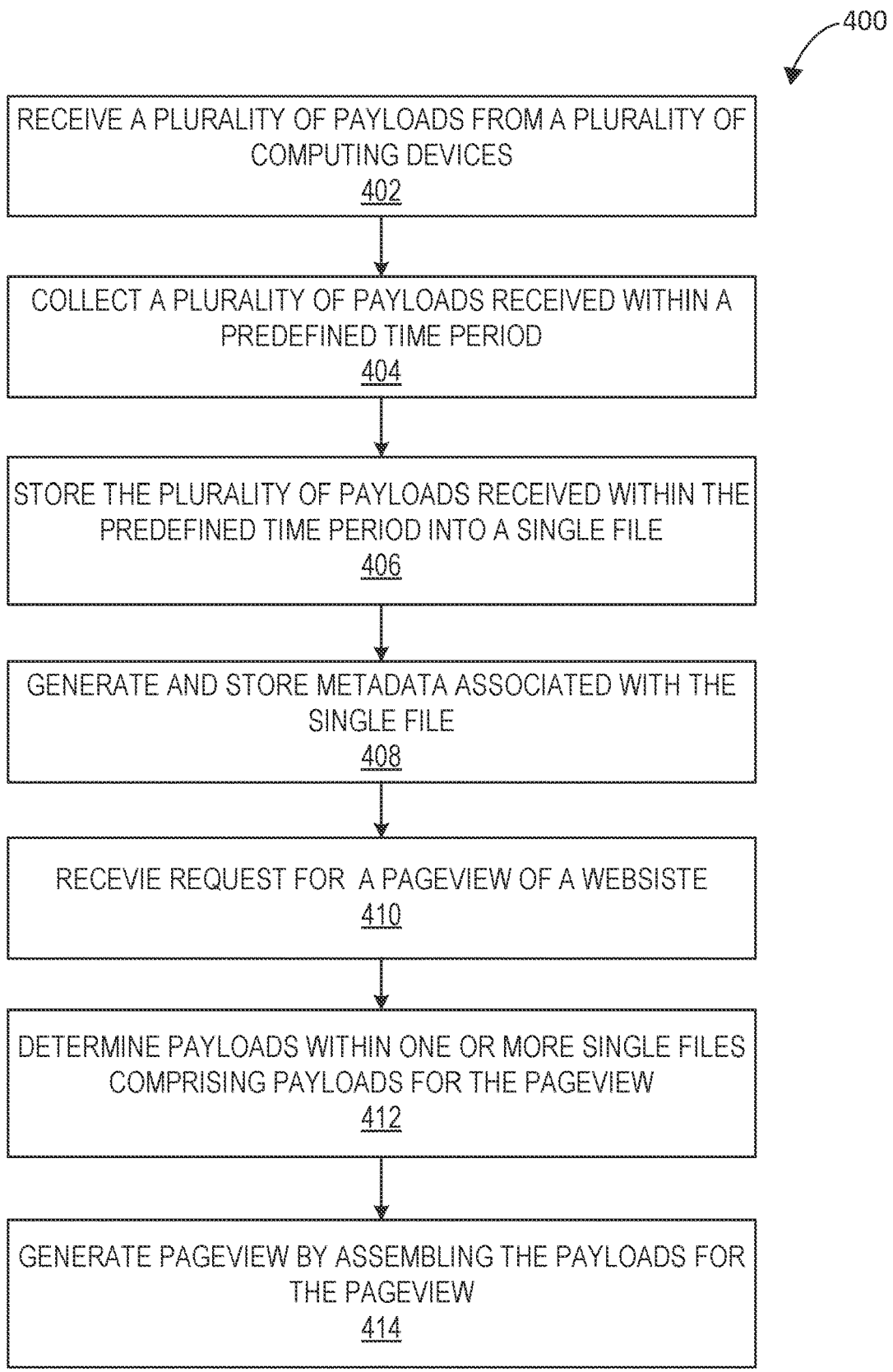
FIG. 4 is a flowchart for a process, in accordance with some examples.

FIG. 4 is a schematic diagram illustrating a process 400. In operation 402, a computing system (e.g., experience analytics server system 124 or experience analytics server 116) receives a plurality of payloads from a plurality of computing devices (e.g., customer client devices 106), each of the plurality of payloads comprising one or more events for a pageview corresponding to a respective website. For example, a number of entities may wish to track events performed by users on one or more webpages of their respective websites. As explained above, an experience analytics script 122 (or other means) records data, related to events (e.g., actions) performed by each user that accesses each webpage of each respective website. As also explained above, events can include text inputs by a user, a movement of a mouse or movement on a touchpad or touchscreen, a selection or click on an interface of a webpage of a website, and other actions performed on a webpage. These recorded events are regularly sent by each computing device as payloads. Each payload contains one or more events for a pageview corresponding to a respective website.

In one example, for every predefined time period (e.g., 30 seconds), the computing system performs a number of operations related to the received payloads. First, the computing system collects payloads received within the predefined time period, in operation 404. For instance, the computing system collects all payloads received in the last 30 seconds. The single file can comprise payloads from a plurality of websites that were received within the predefined time period. As indicated above, each website is associated with a different entity.

Second, the computing system stores these collected payloads in a single file, in operation 406, and generates and stores metadata for the single file, in operation 408, that will be associated with the single file. In one example, the metadata includes a project identifier, user identifier, and pageview identifier for each payload. In another example, the metadata further comprises offsets indicating a location of each payload within each single file. In yet another example, metadata includes a file name for the single file. It is to be understood that the metadata can comprise a subset of this data and/or additional data. The generated metadata is stored in a database, such as database 300 of the experience analytics server system 124, The database comprises metadata for a plurality of single files where each single file corresponds to a respective predefined time period. In one example, the computing system only has to store the metadata in the database resulting in a significantly smaller storage requirement.

The single file can be stored in a datastore such as a cloud-based datastore (e.g., via a cloud computing provider like AWS). In one example, the computing system compresses the plurality of payloads received within the predefined time period into the single file and stores the compressed single file in the cloud-based datastore.

In operation 410, the computing system receives a request for a pageview of a website. For example, a user of a computing device (e.g., member client device 102) can request to view a pageview of a plurality of listed pageviews. The computing device sends the request for the pageview to the computing system. In one example, the request comprises a pageview identifier.

In operation 412, the computing system determines payloads within one or more single files comprising payloads for the pageview. For example, the computing system accesses the database to determine a plurality of payloads within one or more single files comprising payloads for the pageview of the website. In one example, the computing system reads the metadata, in the database, that is associated with the pageview to determine file names for the one or more single files that comprise payloads for the pageview. For example, the computing system determines the files names for the one or more single files that comprise payloads for the pageview (e.g., via a pageview identifier) and associated offsets for each payload within each of the one or more single files.

In operation 414, the computing system generates a pageview by assembling the plurality of payloads for the pageview of the website. For example, the computing system retrieves the payloads from the one or more single files in the datastore. For instance, the computing system locates each payload in each single file by the offset associated with that payload that indicates the exact location of the payload within the single file. The computing system assembles the payloads into a pageview in chronological order based on a time stamp for the payload.

The computing system uses the generated pageview to cause a replay session to be displayed on a computing device. For example, the pageview can be displayed on a user interface on the computing device and the user can select to replay the pageview. Upon detection of the selection of replay, the computing device causes a recording of events to be replayed for the pageview. In one example, the computing device constructs a video out of the recording of events to be viewed in the user interface. In this way, the user viewing the replay of the pageview can see the sequence of events, in chronological order, that were performed by a user on the webpage. Further, the user viewing the replay of the pageview can access a pageview in real time, or near real time, after the events for the pageview are recorded.

In one example, after a predefined time period, the computing system regroups the payloads contained in the single files by project for even faster retrieval and to reduce latency upon a request to view a pageview. For example, the computing system determines that a predefined period of time (e.g., 6 hours) has passed since storing a plurality of single files in the datastore. The computing system sorts payloads in the plurality of single files by project identifier. The project identifier is one datum in the metadata stored for each payload. The computing system groups the payloads by project identifier and a time window of a predefined time. For example, the computing system groups the payloads by 20 minute time windows. Accordingly, each payload associated with a given project identifier and with a timestamp within the 20 minute time window is stored in a single grouped file and associated with the project identifier and time window.

The computing system generates a header for each single grouped file that comprises an offset from the header for each payload indicating the location of the payload within the single grouped file. Each single grouped file is stored in the datastore. In one example, each grouped file is compressed before it is stored in the database. The single grouped files replace the single files that originally held the payloads that are not grouped in the single grouped files.

The computing system generates metadata for each single grouped file and stores the generated metadata in the database. The database thus further comprises metadata for a plurality of single grouped files. Accordingly, the metadata for each payload in the database is updated to include a file name for a respective single grouped file instead of the original single file in which the payload was originally stored.

When the computing system receives a request for a pageview for a website, the computing system access the metadata for the pageview in the database to determine one or more payloads within one or more single files (as explained above with respect to operation 412 of FIG. 4) or to determine one or more payloads within one or more single grouped files. Once the computing system determines one or more single grouped files that comprise payloads for the requested pageview of the website, the computing system generates the pageview by assembling the payloads for the pageview. For example, the computing system reads a minimum and maximum timestamp for a pageview that is stored as metadata in the database. In one example, the single grouped files are optionally associated with a partition within the datastore that indicates a container in the datastore in which the single grouped file is stored. The computing system locates the single grouped files in the datastore that contain the timeframe, based on the minimum and maximum timestamp for the pageview, and optionally the partition, for the project identifier. The computing system gets the header for each of the single grouped files and gets the offsets from the header for each payload for the pageview (e.g., the number of bytes from the header or beginning of the file indicating the location of the payload), The computing system then retrieves each payload for the pageview in the region indicated by the offset for the payload and assembles the pageview from the payloads, as explained above with respect to operation 414 of FIG. 4. The computing system uses the generated pageview to cause a replay session to be displayed on a computing device, as explained above.

Figure 5:
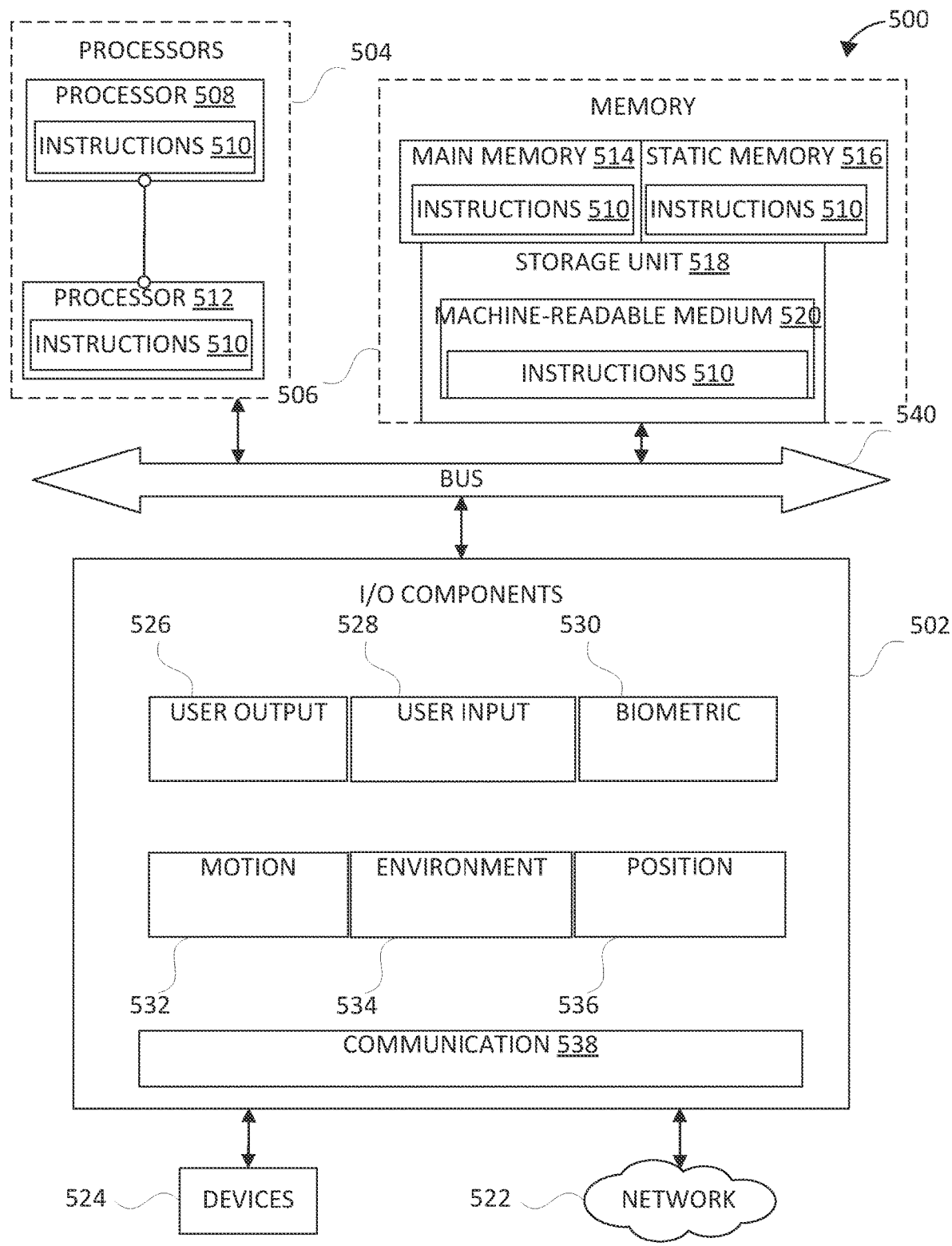
FIG. 5 is a diagrammatic representation of a machine in the form of a computer system within which a set of instructions may be executed for causing the machine to perform any one or more of the methodologies discussed herein, in accordance with some examples.

In this way a pageview can be constructed from raw data in payloads contained in one or more single files or can be constructed from raw data in payloads contained in one or more files grouped by project, depending on when the request is received. When reconstructing a pageview from payloads in one or more single files it is possible that the computing system will need to retrieve payloads from up to 40 files for the majority of pageviews. After the payloads are split by project, the computing system will need to retrieve payloads from up to two files for the majority of pageviews. Thus, retrieving and reconstructing pageviews from payloads in single grouped files is more efficient and uses less computing resources than retrieving and reconstructing pageviews from payloads in single files that are not grouped by project Machine Architecture FIG. 5 is a diagrammatic representation of the machine 500 within which instructions 510 (e.g., software, a program, an application, an applet, an application, or other executable code) for causing the machine 500 to perform any one or more of the methodologies discussed herein may be executed. For example, the instructions 510 may cause the machine 500 to execute any one or more of the methods described herein. The instructions 510 transform the general, non-programmed machine 500 into a particular machine 500 programmed to carry out the described and illustrated functions in the manner described. The machine 500 may operate as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart-watch), a smart home device (e.g., a smart appliance), other smart devices, a web appliance, a network router, a network switch, a network bridge, or any machine capable of executing the instructions 510, sequentially or otherwise, that specify actions to be taken by the machine 500. Further, while only a single machine 500 is illustrated, the term "machine" shall also be taken to include a collection of machines that individually or jointly execute the instructions 510 to perform any one or more of the methodologies discussed herein. The machine 500, for example, may comprise the member client device 102 or any one of a number of server devices forming part of the experience analytics server 116. In some examples, the machine 500 may also comprise both client and server systems, with certain operations of a particular method or algorithm being performed on the server-side and with certain operations of the particular method or algorithm being performed on the client-side.

The machine 500 may include processors 504, memory 506, and input/output I/O components 502, which may be configured to communicate with each other via a bus 540. In an example, the processors 504 (e.g., a Central Processing Unit (CPU), a Reduced instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 508 and a processor 512 that execute the instructions 510. The term "processor" is intended to include multi-core processors that may comprise two or more independent processors (sometimes referred to as "cores") that may execute instructions contemporaneously. Although FIG. 5 shows multiple processors 504, the machine 500 may include a single processor with a single-core, a single processor with multiple cores (e.g., a multi-core processor), multiple processors with a single core, multiple processors with multiples cores, or any combination thereof.

The memory 506 includes a main memory 514, a static memory 516, and a storage unit 518, both accessible to the processors 504 via the bus 540. The main memory 506, the static memory 516, and storage unit 518 store the instructions 510 embodying any one or more of the methodologies or functions described herein. The instructions 510 may also reside, completely or partially, within the main memory 514, within the static memory 516, within machine-readable medium 520 within the storage unit 518, within at least one of the processors 504 (e.g., within the processor's cache memory), or any suitable combination thereof, during execution thereof by the machine 500.

The I/O components 502 may include a wide variety of components to receive input, provide output, produce output, transmit information, exchange information, capture measurements, and so on. The specific I/O components 502 that are included in a particular machine will depend on the type of machine. For example, portable machines such as mobile phones may include a touch input device or other such input mechanisms, while a headless server machine will likely not include such a touch input device. It will be appreciated that the I/O components 502 may include many other components that are not shown in FIG. 5. In various examples, the I/O components 502 may include user output components 526 and user input components 528. The user output components 526 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 528 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 502 may include biometric components 530, motion components 532, environmental components 534, or position components 536, among a wide array of other components. For example, the biometric components 530 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 532 include acceleration sensor components (e.g., accelerometer), gravitation sensor components, rotation sensor components (e.g., gyroscope).

The environmental components 534 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the member client device 102 may have a camera system comprising, for example, front cameras on a front surface of the member client device 102 and rear cameras on a rear surface of the member client device 102. The front cameras may, for example, be used to capture still images and video of a user of the member client device 102 (e.g., "selfies"). The rear cameras may, for example, be used to capture still images and videos in a more traditional camera mode. In addition to front and rear cameras, the member client device 102 may also include a 360° camera for capturing 360° photographs and videos.

Further, the camera system of a member client device 102 may include dual rear cameras (e.g., a primary camera as well as a depth-sensing camera), or even triple, quad or peseta rear camera configurations on the front and rear sides of the member client device 102. These multiple cameras systems may include a wide camera, an ultra-wide camera, a telephoto camera, a macro camera and a depth sensor, for example.

The position components 536 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 502 further include communication components 538 operable to couple the machine 500 to a network 522 or devices 524 via respective coupling or connections. For example, the communication components 538 may include a network interface component or another suitable device to interface with the network 522. In further examples, the communication components 538 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 524 may be another machine or any of a wide variety of peripheral devices (e.g., a peripheral device coupled via a USB).

Moreover, the communication components 538 may detect identifiers or include components operable to detect identifiers. For example, the communication components 538 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 538, such as location via Internet Protocol (IP) geolocation, location via Wi-Fi® signal triangulation, location via detecting an NFC beacon signal that may indicate a particular location, and so forth.

The various memories (e.g., main memory 514, static memory 516, and memory of the processors 504) and storage unit 518 may store one or more sets of instructions and data structures (e.g., software) embodying or used by any one or more of the methodologies or functions described herein. These instructions (e.g., the instructions 510), when executed by processors 504, cause various operations to implement the disclosed examples.

The instructions 510 may be transmitted or received over the network 522, using a transmission medium, via a network interface device (e.g., a network interface component included in the communication components 538) and using any one of several well-known transfer protocols (e.g., hypertext transfer protocol (HTTP)). Similarly, the instructions 510 may be transmitted or received using a transmission medium via a coupling (e.g., a peer-to-peer coupling) to the devices 524.

Software Architecture

Figure 6:
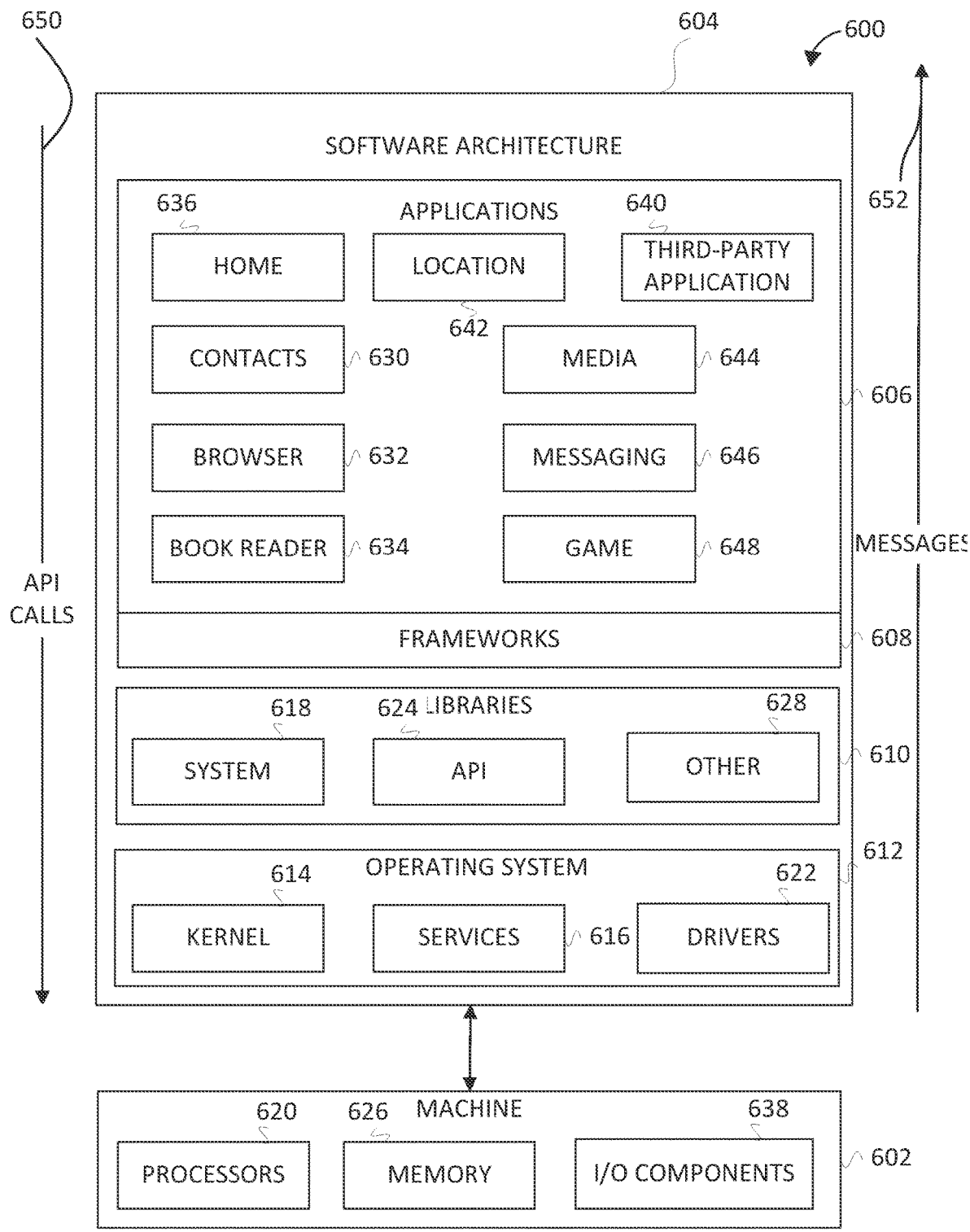
FIG. 6 is a block diagram showing a software architecture within which examples may be implemented.

FIG. 6 is a block diagram 600 illustrating a software architecture 604, which can be installed on any one or more of the devices described herein. The software architecture 604 is supported by hardware such as a machine 602 that includes processors 620, memory 626, and PO components 638. In this example, the software architecture 604 can be conceptualized as a stack of layers, where each layer provides a particular functionality. The software architecture 604 includes layers such as an operating system 612, libraries 610, frameworks 608, and applications 606. Operationally, the applications 606 invoke API calls 650 through the software stack and receive messages 652 in response to the API calls 650.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, processor management (e.g., scheduling), component management, networking, and security settings, among other functionalities. The services 616 can provide other common services for the other software layers. The drivers 622 are responsible for controlling or interfacing with the underlying hardware. For instance, the drivers 622 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 610 provide a common low-level infrastructure used by the applications 606. The libraries 610 can include system libraries 618 (e.g., C standard library) that provide functions such as memory allocation functions, string manipulation functions, mathematic functions, and the like. In addition, the libraries 610 can include API libraries 624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 610 can also include a wide variety of other libraries 628 to provide many other APIs to the applications 606.

The frameworks 608 provide a common high-level infrastructure that is used by the applications 606. For example, the frameworks 608 provide various graphical user interface (GUI) functions, high-level resource management, and high-level location services. The frameworks 608 can provide a broad spectrum of other APIs that can be used by the applications 606, some of which may be specific to a particular operating system or platform.

In an example, the applications 606 may include a home application 636, a contacts application 630, a browser application 632, a book reader application 634, a location application 642, a media application 644, a messaging application 646, a game application 648, and a broad assortment of other applications such as a third-party application 640. The applications 606 are programs that execute functions defined in the programs. Various programming languages can be employed to create one or more of the applications 606, structured in a variety of manners, such as object-oriented programming languages (e.g., Objective-C, Java, or C++) or procedural programming languages (e.g., C or assembly language). In a specific example, the third-party application 640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 640 can invoke the API calls 650 provided by the operating system 612 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics; game consoles, set-top boxes; or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet; a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide interoperability for Microwave Access (WiMAX), Long Term Evolution (LTE)

standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein, A hardware component may also be implemented mechanically, electronically, or any suitable combination thereof. For example, a hardware component may include dedicated circuitry or logic that is permanently configured to perform certain operations.

A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably, in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A computer-implemented method, comprising:
   collecting, within a predefined time period, a plurality of payloads received from a plurality of computing devices within the predefined time period, each payload of the plurality of payloads comprising one or more actions performed by a user on a webpage corresponding to a respective website;
   storing the collected plurality of payloads in a single file in a datastore, the datastore comprising a plurality of single files and each single file corresponding to a respective predefined time period;
   receiving a request for a pageview comprising one or more actions performed by a user on a webpage corresponding to a website;
   accessing the datastore to determine payloads within one or more single files comprising the one or more actions performed by the user on the webpage corresponding to the website;
   generating the pageview by assembling the payloads from the one or more single files comprising the one or more actions performed by the user; and
   causing the one or more actions performed by the user on the webpage corresponding to the website to be replayed on a computing device, using the generated pageview.

2. The method of claim 1, further comprising:
   determining that a predefined period of time has passed since storing a plurality of single files in the datastore;
   sorting the payloads in the plurality of single files by a project identifier associated with each payload;
   grouping the payloads by project identifier and a time window of a predefined time;
   storing each group of payloads with a same project identifier and a same time window of a predefined time in a single grouped file; and
   generating metadata for each single grouped file and storing the generated metadata in a database, the database comprising metadata for a plurality of single grouped files.

3. The method of claim 2, further comprising:
   receiving a request for a second pageview of a second website;
   accessing the database to determine one or more single grouped files that comprises payloads for the second pageview of the second website;
   generating the second pageview by assembling the payloads for the second pageview of the second website; and
   causing one or more actions performed by a second user on a second webpage of the second website to be replayed on the computing device, using the generated second pageview.

4. The method of claim 3, wherein before generating the second pageview by assembling the payloads for the second pageview of the second website, the method comprises:
   determining a location of each payload in the one or more single grouped files by analyzing an index in a header in the one or more single grouped files.

5. The method of claim 1, wherein the single file comprising the plurality of payloads received within the predefined time period comprises payloads from a plurality of websites and wherein each website is associated with a different entity.

6. The method of claim 1, wherein the predefined time period comprises a predefined number of seconds.

7. The method of claim 1, further comprising:
   generating metadata associated with the single file comprising a project identifier, user identifier, and pageview identifier for each payload.

8. The method of claim 1, further comprising:
   reading metadata associated with the pageview to determine the payloads within the one or more single files, the metadata comprising one or more file names for one or more single files comprising one or more payloads associated with the pageview.

9. The method of claim 8, wherein the metadata further comprises offsets associated with each file name indicating a location of each payload within each single file.

10. The method of claim 1, further comprising:
    compressing the plurality of payloads received within the predefined time period into the single file; and
    wherein the compressed single file is stored in the datastore.

11. A computing system comprising:
    a processor; and
    a memory storing instructions that, when executed by the processor, configure the computing system to perform operations comprising:
    collecting, within a predefined time period, a plurality of payloads received from a plurality of computing devices within the predefined time period, each payload of the plurality of payloads comprising one or more actions performed by a user on a webpage corresponding to a respective website;

storing the collected plurality of payloads in a single file in a datastore, the datastore comprising a plurality of single files and each single file corresponding to a respective predefined time period;

receiving a request for a pageview comprising one or more actions performed by a user on a webpage corresponding to a website;

accessing the datastore to determine payloads within one or more single files comprising the one or more actions performed by the user on the webpage corresponding to the website;

generating the pageview by assembling the payloads from the one or more single files comprising the one or more actions performed by the user; and causing the one or more actions performed by the user on the webpage corresponding to the website to be replayed on a computing device, using the generated pageview.

12. The computing system of claim 11, the operations further comprising:
determining that a predefined period of time has passed since storing a plurality of single files in the datastore;
sorting the payloads in the plurality of single files by a project identifier associated with each payload;
grouping the payloads by project identifier and a time window of a predefined time;
storing each group of payloads with a same project identifier and a same time window of predefined time in a single grouped file; and
generating metadata for each single grouped file and storing the generated metadata in a database, the database comprising metadata for a plurality of single grouped files.

13. The computing system of claim 12, the operations further comprising:
receiving a request for a second pageview of a second website;
accessing the database to determine one or more single grouped files that comprises payloads for the second pageview of the second website;
generating the second pageview by assembling the payloads for the second pageview of the second website; and
causing one or more actions performed by a second user on a second webpage of the second website to be replayed on the computing device, using the generated second pageview.

14. The computing system of claim 13, wherein before generating the second pageview by assembling the payloads for the second pageview of the second website, the operations comprise:
determining a location of each payload in the one or more single grouped files by analyzing an index in a header in the one or more single grouped files.

15. The computing system of claim 11, wherein the single file comprising the plurality of payloads received within the predefined time period comprises payloads from a plurality of websites and wherein each website is associated with a different entity.

16. The computing system of claim 11, wherein the predefined time period comprises a predefined number of seconds.

17. The computing system of claim 11, further comprising: generating metadata associated with the single file comprising a project identifier, user identifier, and pageview identifier for each payload.

18. The computing system of claim 11, further comprising:
reading metadata associated with the pageview to determine the payloads within the one or more single files, the metadata comprising one or more file names for one or more single files comprising one or more payloads associated with the pageview.

19. The computing system of claim 11, the operations further comprising:
compressing the plurality of payloads received within the predefined time period into the single file; and
wherein the compressed single file is stored in the datastore.

20. A non-transitory computer-readable storage medium including instructions that, when processed by a computer, configure the computer to perform operations comprising:
collecting, within a predefined time period, a plurality of payloads received from a plurality of computing devices within the predefined time period, each payload of the plurality of payloads comprising one or more actions performed by a user on a webpage corresponding to a respective website;
storing the collected plurality of payloads in a single file in a datastore, the datastore comprising a plurality of single files and each single file corresponding to a respective predefined time period;
receiving a request for a pageview comprising one or more actions performed by a user on a webpage corresponding to a website;
accessing the datastore to determine payloads within one or more single files comprising the one or more actions performed by the user on the webpage corresponding to the website;
generating the pageview by assembling the payloads from the one or more single files comprising the one or more actions performed by the user; and
causing the one or more actions performed by the user on the webpage corresponding to the website to be replayed on a computing device, using the generated pageview.

* * * * *